Figure 1:
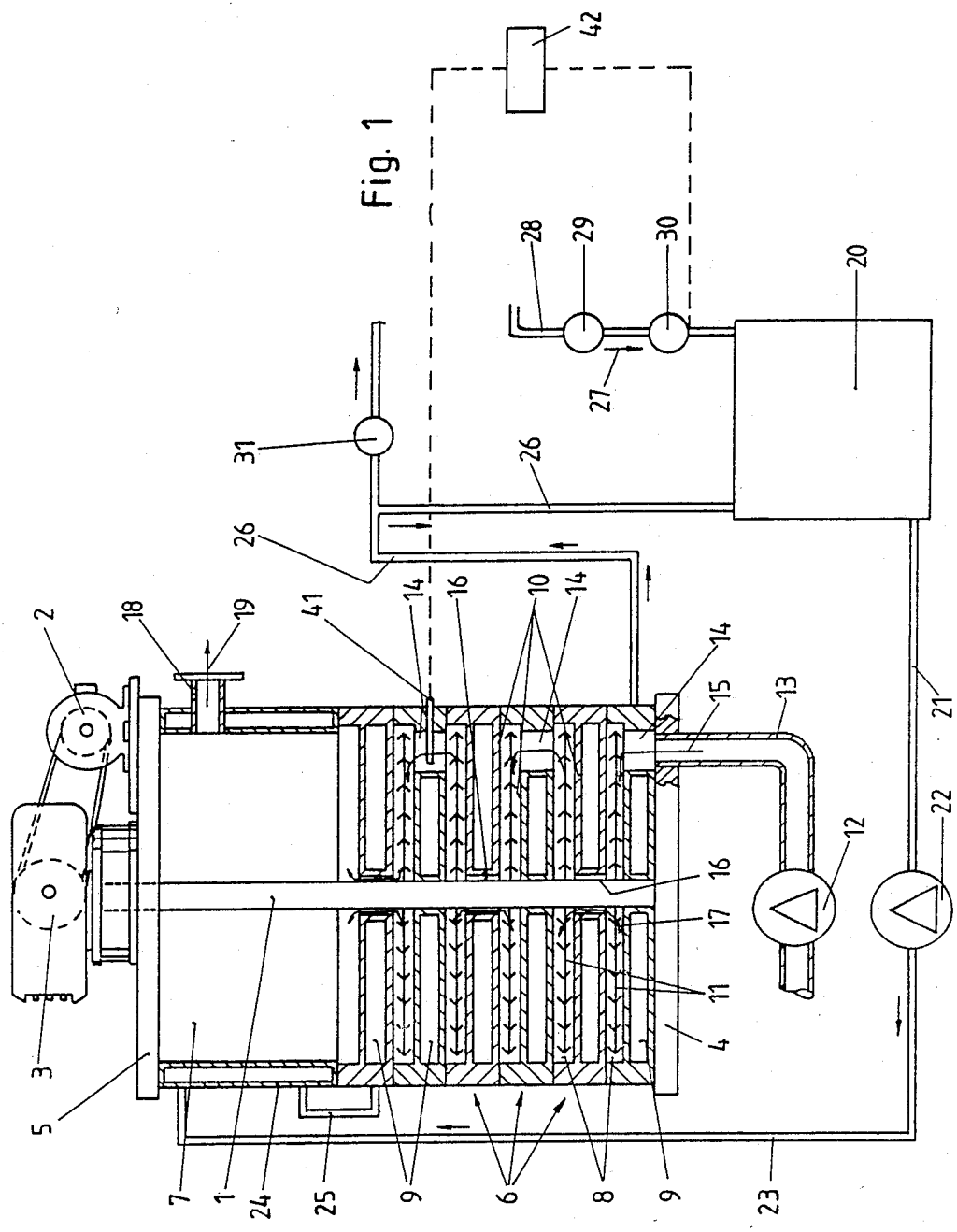

United States Patent [19]

Sollich

[11] Patent Number: 4,892,033
[45] Date of Patent: Jan. 9, 1990

[54] METHOD AND APPARATUS FOR CONTINUOUS PROCESSING OF SUBSTANCES CONTAINING COCOA BUTTER OR SIMILAR FATS

[75] Inventor: Helmut Sollich, Rabenkirchen, Fed. Rep. of Germany

[73] Assignee: Sollich GmbH & Co. KG, Bad Salzuflen, Fed. Rep. of Germany

[21] Appl. No.: 295,518

[22] Filed: Jan. 11, 1989

Related U.S. Application Data

[62] Division of Ser. No. 188,462, Apr. 29, 1988, Pat. No. 4,859,483.

[30] Foreign Application Priority Data

May 2, 1987 [DE] Fed. Rep. of Germany ....... 3714663

[51] Int. Cl.$^4$ .......................... A23C 3/04; A23G 1/18
[52] U.S. Cl. .......................................... 99/455; 62/354; 99/470; 99/517; 165/94
[58] Field of Search ................. 99/452, 455, 460, 462, 99/470, 483, 484; 426/519, 520, 524, 660; 62/354, 353, 343, 342, 381; 165/94, 95

[56] References Cited

U.S. PATENT DOCUMENTS

| 2,677,942 | 5/1954 | Schott et al. | 99/455 |
| 4,059,047 | 11/1977 | Sollich | 62/354 |
| 4,648,315 | 3/1987 | Blum | 165/94 |

Primary Examiner—Timothy F. Simone
Assistant Examiner—Timothy F. Simone
Attorney, Agent, or Firm—Max Fogiel

[57] ABSTRACT

A method of and apparatus for continuously processing substances containing cocoa butter or similar fats, especially chocolate masses, in a tempering machine with several stages of cooling on cooling surfaces followed by stages of heating on heating surfaces. The mass is supplied through mass chambers, in which it is stirred by powered impellers, to the cooling stages and to the heating stages. A cooling medium flows through cooling chambers adjacent to the cooling surfaces and a heating medium flows through heating chambers adjacent to the heating surfaces. Enough cooling medium flows through the cooling chambers to generate turbulence. The mass in the mass chambers is stirred powerfully enough to thoroughly blend it. The mass is removed from the cooling and heating surfaces without being touched by the mixing impellers in an operation that involves a shearing gradient in the cap between the cooling and heating surfaces and the mixing impellers of from 500 to 4000 sec$^{-1}$.

15 Claims, 5 Drawing Sheets

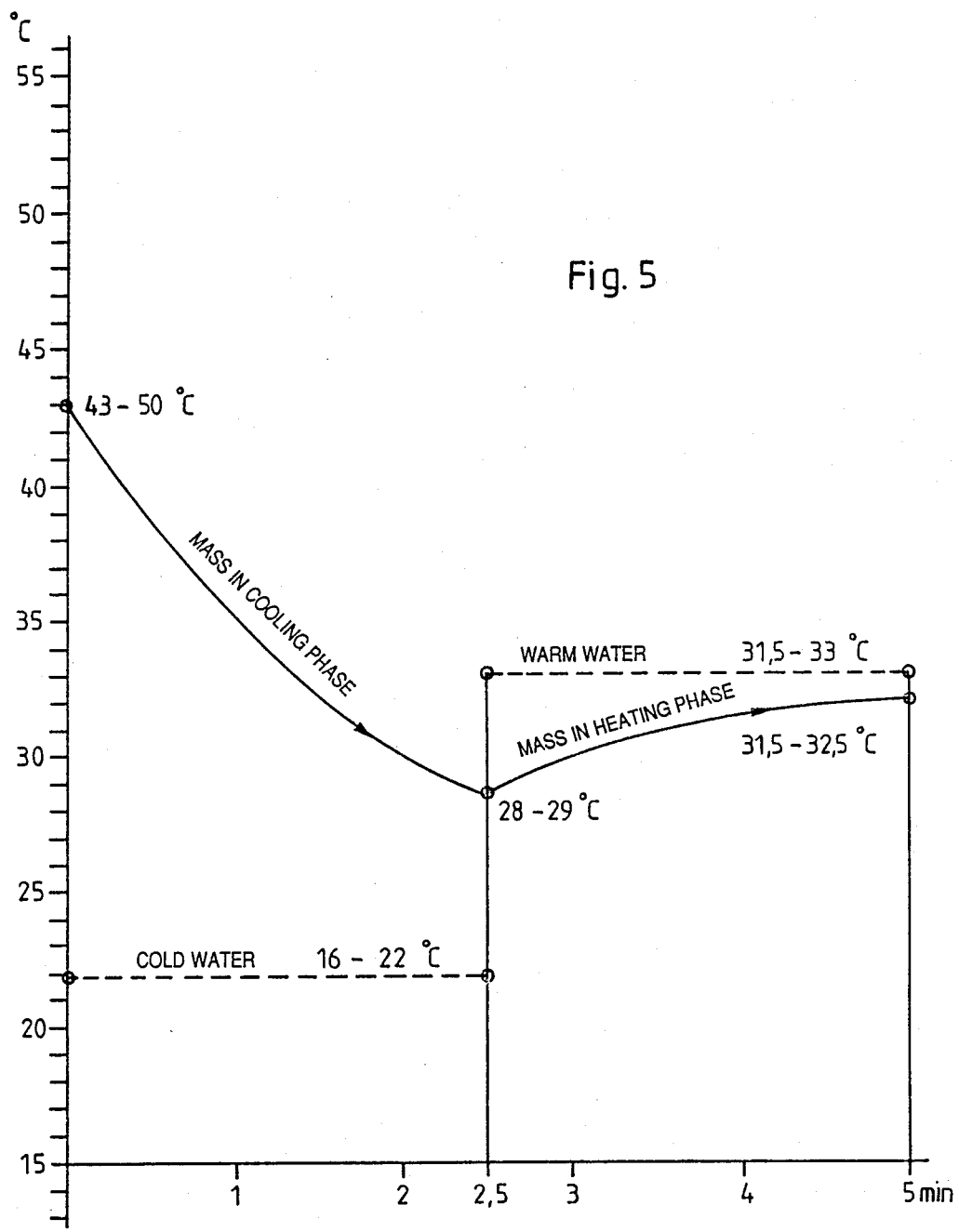

METHOD AND APPARATUS FOR CONTINUOUS PROCESSING OF SUBSTANCES CONTAINING COCOA BUTTER OR SIMILAR FATS

This is a division of application Ser. No. 188,462 filed Apr. 29, 1988, U.S. Pat No 4,859,483.

The point of departure for the invention is a method of continuously processing substances containing cocoa butter or similar fats, especially chocolate masses, in a tempering machine with several stages of cooling on cooling surfaces followed by stages of heating on heating surfaces, whereby the mass is supplied through mass chambers, in which it is stirred by powered impellers, to the cooling stages and to the heating stages and whereby a cooling medium flows through cooling chambers adjacent to the cooling surfaces and a heating medium flows through heating chambers adjacent to the heating surfaces. The invention simultaneously discloses an especially appropriate apparatus for carrying out the method.

A method of continuously processing and a continuously operating tempering machine are known from German Patent No. 2 536 063. Cooling stages are created inside a cylindrical structure with a vertical drive-shaft. A cooling medium, especially water, flows through the cooling chambers. Impellers are accommodated in the mass chambers. The primary function of the impellers is to scrape cooled mass from the cooling surfaces. The scraped-off mass is mixed comparatively less powerfully with the rest of the mass in the mass chamber. The impellers that carry out the scraping, two of which are accommodated in each mass chamber, are in direct contact with the cooling surfaces, resulting in locally variable speeds. The speed is lower toward the center than at the outside, in the vicinity of the surface of the cylinder. Nests and zones wherein the mass solidifies and accordingly does not participate in the subsequent processing, occur at the interior, where the impellers rotate more slowly. This process is facilitated in that the access openings between each pair of adjacent chambers are positioned radially relatively far out. Although the access openings are displaced 180° from one another stage by stage, the result is zones in which the mass travels relatively rapidly through the individual mass chambers and stages, whereas other regions of the mass flow relatively more slowly. The cooling action is unsatisfactory and less effective to the extent that nests and solidified mass occur radially inside. The mass is accordingly not optimally tempered as it leaves. The mass also tends to contain a comparatively low number of stable crystals of the $\beta$ type. The solidified mass is on the whole soft in such cases, does not have an optimal luster, and tends to bloom. The temperature of the mass as it leaves the machine is, for light chocolate, approximately 26°-28° C. and, for dark chocolate, approximately 29°-30° C. A known way of counteracting the aforesaid defects is to send more cold water through the cooling chambers. The flow at the cooling-medium end, however, remains laminar. The flow of cooling medium is controlled with a magnetic valve with a comparatively small volume of cooling medium in such a way that the medium is alternately allowed access to and blocked off from the cooling chambers. The mass at the mass outlet can in this method of continuously processing be more viscous than desired. When such a chocolate mass is further processed into bars for example, the bars are more difficult to release from the mold because they do not contract sufficiently. The mass itself does not keep well. Its appearance also leaves something to be desired because the bars are light grey and lusterless. The local temperature differences in the mass that derive from the scraping impellers and are not corrected due to poor blending can have a deleterious effect in certain areas in that local temperature elevations occur to the detriment of preliminary crystallization. Since the flow through the tempering machine is laminar at the mass end as well, heat transfer and heat compensation will be comparatively poor inside the mass.

German Patent No. 1 607 802 discloses a method of discontinuously processing similar masses, batches of which are over a comparatively longer time blended, stirred, and processed in a boiler. The heat-exchange surface is very small in relation to volume, and the process is carried out with comparatively small temperature differences between the mass and the cooling medium, resulting in correspondingly longer processing times. Although a mass processed by this method is satisfactorily stable, the formation of macrocrystals is deleteriously promoted, and the mass will not contract sufficiently, making it more difficult to release from the mold. Furthermore, a mass with a large number of macrocrystals is not very lustrous.

It is on the other hand known that a high luster and outstanding appearance will occur in masses processed in this way when the mass has a high percentage of $\beta$ crystals when it precrystallizes. Crystals of this type occur at temperatures ranging from approximately 29° to 34° C., whereas unstable modifications (the $\beta$ type) mainly occur at from approximately 24° to 29° C.

The object of the invention is to improve a continuous method and an associated apparatus of the type initially described to the extent that enough crystals of the stable $\beta$ type will occur in the mass at a high mass-outlet temperature, whereby microcrystals will be created and macrocrystals prevented. The resulting crystals should not be too large to prevent the processed mass from attaining and maintaining flow properties that will facilitate further processing.

This object is attained in a method of the type initially described in that enough cooling medium flows through the cooling chambers to generate turbulence, in that the mass in the mass chambers is stirred powerfully enough to thoroughly blend it, and in that the mass is removed from the cooling and heating surfaces without their being touched by the mixing impellers in an operation that involves a shearing gradient in the gap between the cooling and heating surfaces and the mixing impellers of from 500 to 4000 sec$^{-1}$. The present invention abandons laminar flow through the cooling chambers and comparatively increases output both at the cooling-chamber and at the mass-chamber end. The increase at the mass end is due to relative turbulence on the part of the particles of mass, meaning that the mass is constantly being broken down and reconstituted from point to point. The process can eventually be increased to the point that turbulence is even generated at least regionally or locally at various points within the mass. Also important is the maintenance of a sufficiently high shearing gradient, defined as the quotient of the difference in speed between the walls that demarcate the gap and the width of the gap. The walls that demarcate the gap consist on the one hand of the cooling and heating surfaces and on the other of the mixing impellers. The shearing gradient will also change radially because the speed changes locally as a function of the radius. Thus, shearing gradients of different dimensions at the local points in accordance with increasing radius will be exploited simultaneously. The different shearing gradients, however, will be part of a comparatively wide range and will in themselves be large in absolute terms. It is, surprisingly, possible with the method in accordance with the invention to generate comparatively enough (4–5%) stable β-type crystals to ensure that the mass will heat up over the melting range of the unstable crystals during the heating phase that follows the cooling phase while still retaining the stable crystals in the β form. It accordingly becomes possible not only to increase the mass-outlet temperature but also that of the cooling medium. The cooling medium will in any case be warmer than 16° C. and, when a large volume is circulated, be maintained at a comparatively small temperature range of 2°–3° C. The turbulence at the cold-water end considerably promotes heat transfer. Since the same is true at the mass end, it becomes possible to maintain a more precise and uniform temperature, and massoutlet temperatures of 29°–34° C. at the end of the heating stage are completely realistic. Another result is satisfactory flow properties and constant viscosity on the part of the mass, again promoting the further-processing characteristics. Thus, a volume of chocolate that is to be transferred to a wrapping machine can be aligned more precisely and at only a slightly higher temperature, so that the mass will not thicken. The comparatively high temperature at the mass end results in a very low proportion of unstable β crystals. The shelf life and stability of the products manufactured with the mass are better. Since they also contract comparatively more extensively, they are easier to extract from even more complex molds. The turbulence at both the cooling-medium end and the mass end results in slighter temperature fluctuations, and the mass-outlet temperature will be more uniform, also resulting in a constant viscosity. The product has a very attractive appearance with a high luster. It breaks crisply. The turbulence at the mass end distributes the stable β crystals homogeneously throughout the mass, resulting in a uniform breaking structure throughout the cross-section. The improved heat exchange at the cold-water end also makes it possible to operate with somewhat higher mass-intake temperatures, so that the mass will be in a state featuring the advantage that all the crystals have been melted out. The higher mass-intake temperature requires and allows in a practical way this comparatively hot mass to come into contact with the comparatively cool or colder cooling surfaces at a temperature range of 16°–22° C., resulting in gradual initial ignition for creating and precipitating the stable β crystals. This stable type of crystal forms more easily against comparatively cooler surfaces than against warmer surfaces. The use of a shearing gradient on the one hand and of high turbulence at the mass end on the other hand distributes these stable β-type crystals uniformly throughout the mass, so that, since they are homogeneous throughout the cross-section of the mass, they will entail the formation or occurrence of still other β crystals. This phenomenon is probably to be ascribed to the yield of β crystals being a previously unattained 4.5%. Lower shearing gradients. in the range of 500 to 1000 sec$^{-1}$ can be attempted in viscous masses. More fluid masses can be handled better at higher shearing gradients, on the order of 2000 to 4000 sec$^{-1}$. The heat of friction deriving from the shearing gradient, however, must never be allowed to damage the crystals and accordingly melt any that have already formed or prevent others from forming. Excessive shearing gradients can accordingly be considered detrimental.

The cooling medium is constantly circulated through the cooling chambers with its temperature controlled or regulated. Intermittent control is accordingly abandoned and the cooling surfaces are constantly exploited. No local damage to the mass occurs because wide fluctuations in temperature are avoided. Temperature regulation throughout the continuous cooling-medium circulation makes it possible to adjust to the output of mass. The cooling medium is in any case circulated at a temperature of more than 16° C. and preferably at 16°–22° C., whereby the relatively large volumes of water can easily be handled because they are essentially traveling only in a circle.

The heating medium is likewise continuously circulated through the heating chambers with its volume and temperature maintained constant. This mode of operation is possible because the mass in the initial stage, in the cool phase, that is, is cooled to a temperature that, although it differs in accordance with application, always remains constant, so that regulating the heating medium in the second stage, the warm phase, that is, will establish the corresponding mass-outlet temperature. The mass-outlet temperature can suprisingly be higher than has previously been possible, specifically in the neighborhood of 2° C. Astonishingly, this measure neither damages the mass nor decreases the percentage of stable β crystals.

The mass can in an initial stage be cooled to 28°–29° C. while creating the largest possible number of stable β crystals, subsequent to which the mass is heated in a subsequent stage to a mass-outlet temperature of approximately 31.5°–32.5° C. with the heating medium at a constant temperature of approximately 31.5°–33° C. The length of the two stages can be approximately the same, with a slightly longer time spent in the second stage, the warm phase.

The apparatus for carrying out the method operates with a tempering column in the form of a cylinder consisting of a stack of several cooling chambers that communicate with a cooling-medium circulation system alternating with several heating chambers that communicate with a heating-medium circulation system, with mass chambers left between the cooling surfaces and the heating surfaces, accommodating impellers that rotate on a common vertical shaft, and communicating with one another through access openings. A pump forces mass through the mass chambers, another pump forces cooling medium through the cooling chambers, and a third pump forces heating medium through the heating chambers. The access openings between each pair of adjacent mass chambers are, in accordance with the invention, positioned alternately radially outward and radially inward. The impellers are non-contacting scraping and blending components. The cooling-medium pump is, for the purpose of generating turbulence, designed for high output. The cooling-medium circulation system has temperature controls. The skillful radially inward and outward alteration in the positions of the access openings forces the mass to flow uniformly through the mass chambers. The formation of nests and solidified zones is reliably prevented and the residence time of the invention particles of mass is within a constant range. The impellers are not simply-non-contacting scraping components but also carry out a considerable amount of blending, generating turbulence at the mass end. This turbulence is exploited in a practical way to keep the cooling surfaces comparatively small. The cooling-medium pump on the other hand must be designed for a high output, although the resulting expense can be controlled. The continuous, uninterrupted, that is, cooling-medium circulation system can also be controlled in relation to temperature, with any changes in temperature, which occur at any rate within a narrow range, adjusting vary rapidly because the volume of cooling medium is considerably larger than previously.

The impellers can be arms that extend radially out of the driveshaft and are equipped with a number of mixing blades. The essential purpose of these impellers is to blend and agitate the mass to the point of turbulence, whereas the removal of mass from the cooling surfaces is secondary, in that the latter result is sufficiently ensured by the shearing gradient.

Each mass chamber, which is essentially demarcated by two cooling surfaces, can accommodate only one impeller with its arms positioned more or less in the middle and equipped with blades on each side in such a way as to force the mass in opposite directions. This measure results in the intended powerful turbulence. The mass is conveyed in a circle in zones of different circumference, covering as it moves the total height of the mass chamber. The motion occurs in zones that differ only in their radial position. Since the mass is also forced from inside out and, in the adjacent mass chamber, from outside in, the direction along which the mass travels through the whole system is superimposed over the aforesaid corkscrew-like motion, resulting in a double-component motion through the mass chambers.

The blades can be in the shape of plates positioned aslant on the impeller arms. The blades will accordingly force the mass radially and in opposite directions on each side, resulting in the aforesaid annular bead-like motion.

The blades can be mounted at radially different slanting positions with the object of counteracting or compensating for local drive speeds that differ in accordance with radius. The blades nearer the center should accordingly be mounted at a comparatively greater angle than are the radially outer blades, where the speed is at any rate higher.

The arms can be perforated in order to promote penetration of the mass from the lower half of a mass chamber into the upper half and vice versa.

The arms can be mounted on bearing rings that surround the driveshaft, and the bearing rings can be perforated at one side to create the inner acces oenings. This measure is a very simple way of providing the radially inner access openings. The advantage is that the impellers can be identical in design and only need to be positioned at an angle of 180° C. to one another from chamber to chamber. The outer access openings can be created in a known way, It is also possible to package several cooling and/or heating stages together and provide each package of cooling stages with its own cooling-medium circulation system or subsidiary cooling-medium circulation system and/or each package of heating stages with its own heating-medium circulation system or subsidiary heating-medium circulation system. This is an ingenious way of affecting the chronological temperature behavior in the mass of chocolate. The packages can have different numbers of cooling stages. Each package can be provided with its own temperature-regulation system.

The invention will now be illustrated and described with reference to a preferred embodiment.

Figure 2:
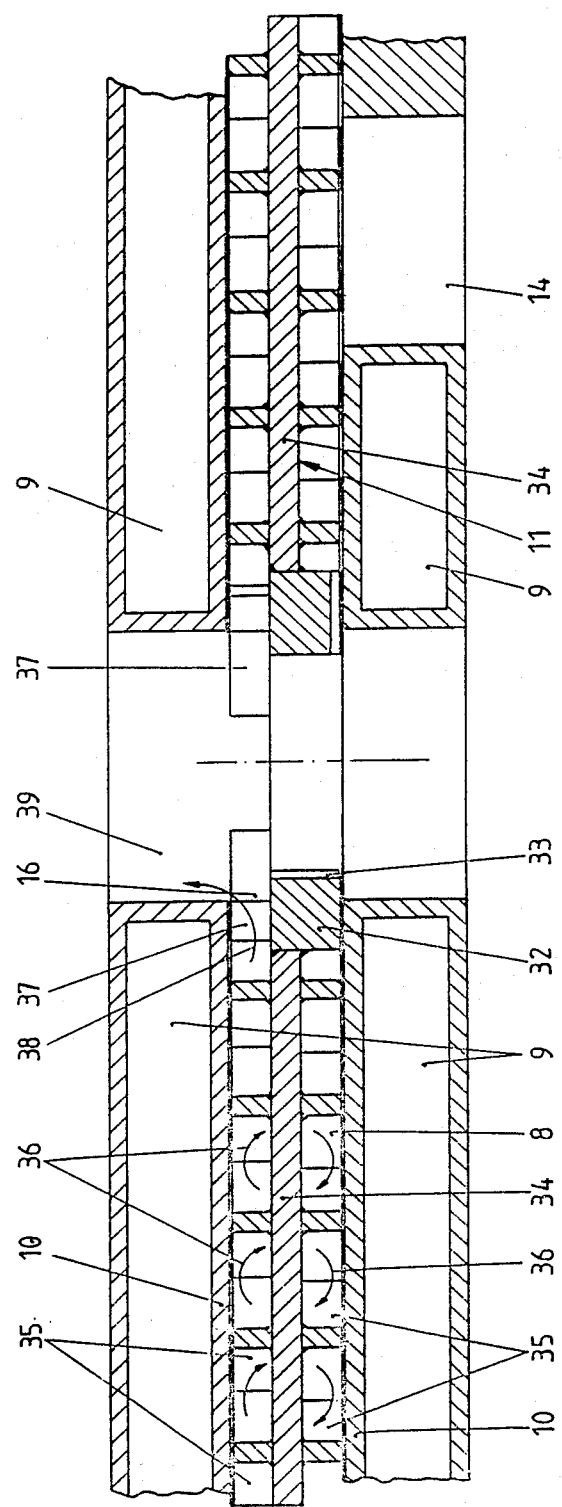
Figure 3:
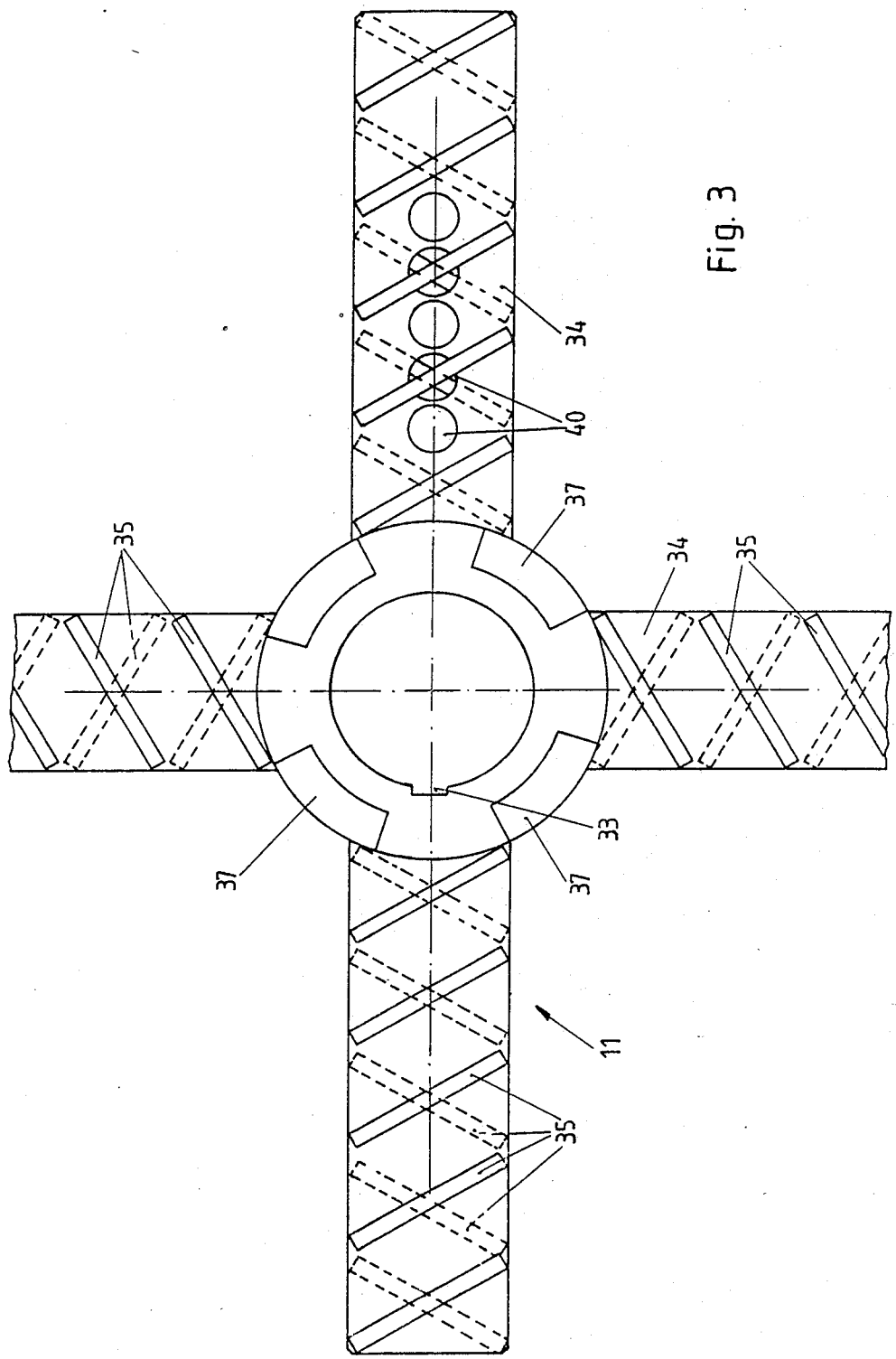
Figure 4:
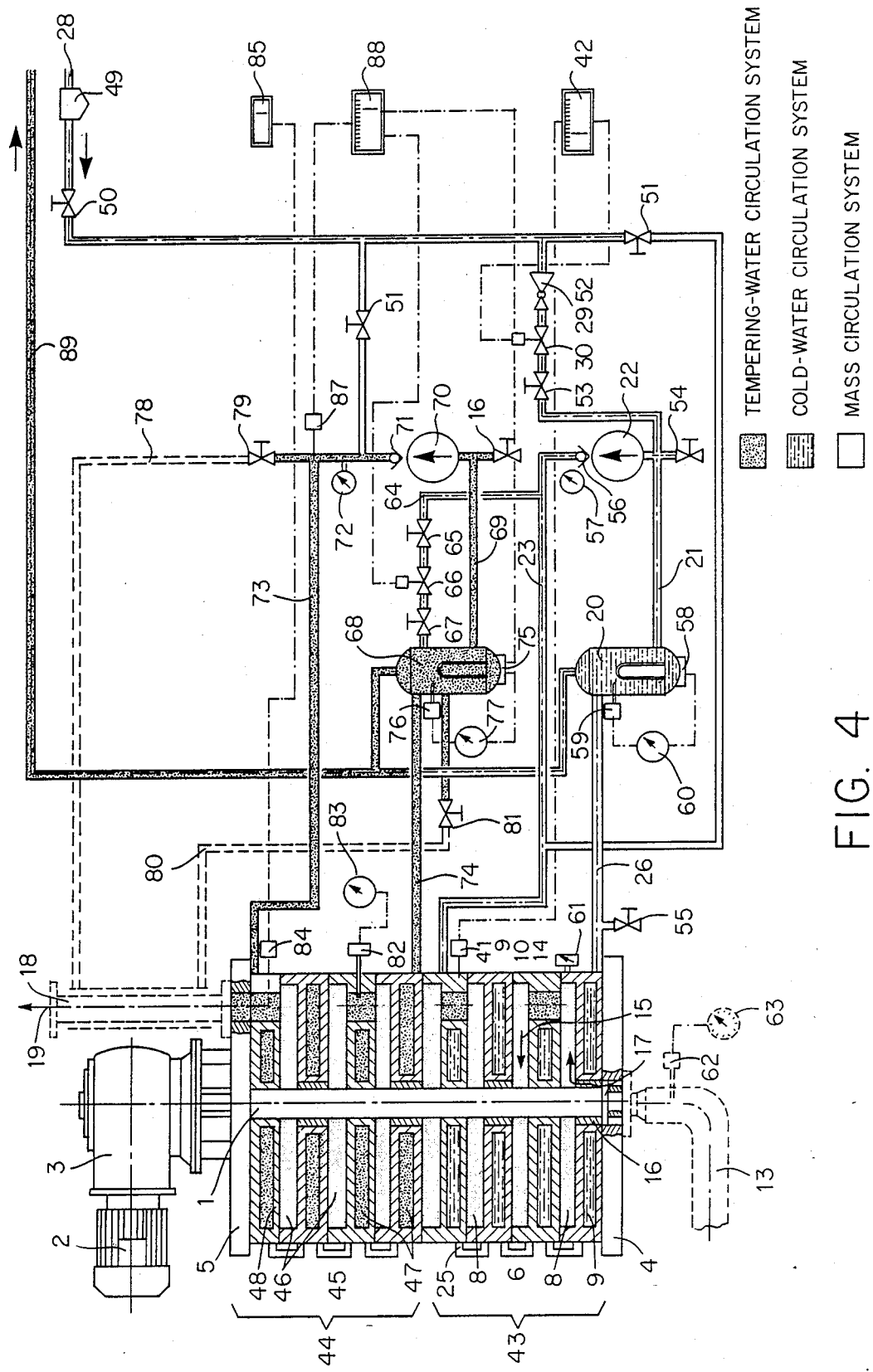

FIG. 1 is a schematic representation of the essential components of one embodiment of the apparatus, FIG. 2 is a vertical section through a mass chamber and impeller, FIG. 3 is a top view of an impeller, FIG. 4 is a schematic illustration showing the essential components of another embodiment of the invention, and FIG. 5 is a diagram of temperature over time in different sections of the apparatus illustrated in FIG. 4.

The apparatus illustrated in FIG. 1 is essentially cylindrical. Extending along its axis is a driveshaft 1 that is powered by a motor 2 by way of a transmission 3. Between a base plate 4 and a cover plate 5 are a number of cooling stages 6 and a reservoir 7. Each cooling stage 6 has a mass chamber 8 and a cooling chamber 9. Each end of a mass chamber 8 is adjacent to a cooling chamber 9, creating a cooling surface 10. Each mass chamber 8 accommodates an impeller 11 that is connected to driveshaft 1 in such a way that the impellers are powered inside mass chambers 8. The mass that is to be processed is introduced by a pump 12 into the lowest mass chamber 8 in cooling stages 6 through a line 13 and a through an access opening 14. Access opening 14 is positioned radially relatively far out in the lowermost cooling stage 6. The mass is accordingly forced outward and eventually travels inward through mass chamber 8 in the direction indicated by arrow 15 while being powerfully blended and cooled in that the subsequent access opening 16 between the lowermost and next-to-lowermost mass chamber 8 is positioned radially inward, adjacent to driveshaft 1. At this point the mass travels in the direction indicated by arrow 17. In the next-to-lowermost mass chamber 8 the mass also travels from inside out while being powerfully blended and cooled against cooling surface 10 in beadlike and spiraling paths until it again reaches a radially outer acces opening 14 in the vicinity of the cooling stage 6 that is third from the bottom. Thus access openings 16 and 14 alternate from stage to stage, creating definite flow conditions for the mass with no stagnant regions, whereas the mass is forced alternately into mass chambers 8 from inside out and from outside in. Impellers 11 are designed and operated in such a way that the mass will travel through mass chambers 8 subject to powerful blending and turbulence, with the turbulence occurring especially, however, at certain points. This measure considerably improves the transfer of heat from cooling surfaces 10 to the mass. The mass is uniformly blended by impellers 11 without streaking. At the uppermost cooling stage 6 the mass, which is now finished and accordingly tempered, can enter reservoir 7 as illustrated, whence it travels through a mass outlet 18 in the direction indicated by arrow 19 and thence to another processing station, a wrapping station for example. Reservoir 7, however, is not an essential component of the apparatus and can accordingly be left out, in which case mass outlet 18 will communicate directly with uppermost cooling stage 6.

The associated cooling-medium circulation system, which as a rule employs water, has a mixing tank 20, from which a line 21 leads to a pump 22. The cooling medium flows initially through a line 23 and into a double-walled housing 24 around reservoir 7. It flows through a line 25 into the cooling chamber 9 in uppermost cooling stage 6. Since the cooling chambers 9 in each stage communicate with one another from top to bottom, the cooling medium will eventually arrive back in mixing tank 20 through a line 26. If there is no reservoir 7, line 23 will communicate directly with the cooling chamber 9 in uppermost cooling stage 6. The cooling water will generally flow in a direction opposite that of the chocolate mass.

Although only one package of cooling stages 6 is illustrated in FIG. 1, the apparatus can also be constructed out of several packages of cooling stages 6. In this case each package will have its own cooling-medium circulation system or subsidiary cooling-medium circulation system. The individual cooling-medium circulation systems or subsidiary cooling-medium circulation systems can in a practical way be operated at different temperatures. The individual packages of cooling stages 6 need not be especially far apart but can be directly adjacent. The number of cooling stages 6 in each package can also be different in order to control precrystalization.

The cooling water will in every case be circulated by pump 22 or by means of other pumps at a high volume, at a high speed, and subject to powerful turbulence through cooling chambers 9. The temperature of the cooling water will be approximately 16°–22° C. Due to the large volume of water being circulated, the temperature will be kept within very narrow limits. The temperature of the cooling water is decreased by the addition of fresh water in the direction indicated by arrow 27 through a line 28, which accommodates a manually adjusted valve 29 and a magnetically controlled valve 30. It will be obvious that magnetically controlled valve 30 is controlled in accordance with temperature by means of temperature sensors extending into the mass chambers at various points. One such temperature sensor 41 is shown. The cooling-medium circulation system is operated continuously, and there is accordingly no time at which pump 22 is not working. When fresh water is added to the cooling-medium circulation system to lower its temperature, the excess water is removed through a valve 31. Excess heat is removed from the mass in the same way. The mass is generally supplied through a pump 12 at a higher temperature than that employed for processing at mass outlet 18. The flow at the cooling-water end is always subject to turbulence, with a high Reynolds number. The desired mass-outlet temperature at the end of one cooling stage 6 is established at temperature controls 42 and subsequently governs the volume of fresh water supplied through magnetically controlled valve 30.

FIG. 2 is a section through an individual mass chamber 8 adjacent to two cooling chambers 9. Driveshaft 1 has been left out for the sake of clarity. It will be obvious that mass chamber 8 accommodates only a single impeller 11, which has a bearing ring 32 with a groove 33 that is engaged by a spring on driveshaft 1. Extending radially outward are impeller arms 34, positioned 90° C. apart for example as illustrated in FIG. 3. Arms 34 have impeller blades 35 mounted at an angle on the top and bottom as will be particularly evident from FIG. 3. The angles at the top and bottom are opposite, ensuring thorough blending of the mass. Annular bead-like zones, indicated by arrows 36, form progressively radially outward. Since the mass is being forced through by pump 12, these zones will of course extend radially from the outside in and from the inside out. The result is a powerful turbulence, with the mass flowing uniformly through every region of each mass chamber 8. It will also be evident from FIG. 2 that blades 35 operate remotely, without, that is, contacting cooling surfaces 10. The motion of the mass itself is sufficient to constantly clean cooling surfaces 10 and remove mass from them and include it in the spiraling bead-like blending action. The mass flows radially from the outside in through the mass chamber 8 illustrated in FIG. 2, meaning that it travels through access opening 14 and access opening 16 into the next mass chamber positioned just above. For this purpose groove 33 has rib-like elevations 37, which are perforated or offset along the circumference, so that the mass can travel inward in the direction indicated by arrow 38. The next cooling stage 6 has at this point an annular space 39 left between its wall and driveshaft 1 and augmenting access opening 16. The impellers 11 in individual mass chambers 8 are identical in structure and are installed at different angles to create access openings 16.

FIG. 3 is a top view of an impeller 11. It can have more than four arms 34. The arms themselves can also have perforations 40 as indicated in the vicinity of one arm 34. The function of these perforations is to allow the mass to penetrate from the bottom up and from the top down in the direction indicated by arrow 36 (FIG. 2) in the vicinity of arms 34 as well. The angle of the blades 35 illustrated in FIG. 3 is identical along the radius. Since the radially outer arms 34 necessarily revolve more rapidly, it is also possible to orient blades 35 in such a way that their angle will continuously decrease from the outside in, in order to equalize the speeds. Blades 35 are straight, projecting, plate-like components. They can also be in the form of shovels.

The apparatus illustrated in FIG. 4 is basically similar to the one illustrated in FIG. 1. The bottom of driveshaft 1 is also surrounded by cooling stages 6 that together constitute a cooling phase 43, whereas there is a heating phase 44 at the top. The apparatus can also have a reservoir 7 as in the embodiment illustrated in FIG. 1, although this will not be necessary in most cases. Heating phase 44 has heating stages 45 that differ in principle from cooling stages 6 not in their structure but only in how they are operated, in that the mass is cooled in the vicinity of cooling phase 43 and heated again as intended in the vicinity of heating phase 44. Each heating stage 45 accommodates a mass chamber 46, with access openings 14 and 16 positioned alternately radially inward and outward. The design of heating stages 45 does not differ from that of cooling stages 6. Thus, heating stages 45 also have heating chambers 47 and heating surfaces 48, against which the mass is heated. Impellers 11 are, for the sake of clarity, not illustrated. They are continuously operated inside mass chambers 46. The mass being processed is forced by an unillustrated pump though line 13 and through the access opening 16. radially inward in this case, in the lowermost mass chamber 8, where it is subjected to turbulence by the impellers and arrives radially farther out, arriving in the subsequent chamber through the radially outer access opening 14. Thus, the mass will migrate, subject to the force of the unillustrated pump, through all the mass chambers 8 in cooling phase 43 and will arrive in the lowermost mass chamber 46 in heating phase 44. At this point the mass is heated again.

How the various circulation systems are designed and positioned will now be described. Fresh water arrives at a valve 51, through which it can be introduced into the circulation system associated with cooling phase 43, by way of a line 28, which includes a contaminant filter 49 and a manually operated cock 50. This circulation system has a mixing tank 20, from which a line 21 leads to a pump 22. Another line 23 leads from the pump to the uppermost stage 6 in cooling phase 43, specifically inside the cooling chamber 9 located at that point. The cooling water leaves lowermost cooling chamber 9 and returns to mixing tank 20. Accommodated in a line 52 that leads from line 28 to line 21 are a valve 29 that can be a pressure-reduction valve, a magnetically controlled valve 30, and a manually operated cock 53. Cooling water can accordingly be supplied from upstream of the circulation system through line 52 as needed to lower the temperature of the water circulating through cooling phase 43. This initial circulation system has water-outlet valves 54 and 55. Downstream of pump 22 there can be a check valve 56 and a manometer 57. Mixing tank 20 is equipped with a heater 58, which can be activated by a temperature sensor 50 in conjunction with a contact thermometer 60 and is intended for heating the mass at night, when it is simply to be maintained liquid inside the apparatus even though production is not proceeding. Temperature sensor 41, which measures the temperature of the mass at the end of cooling phase 43, regulates or controls the temperature in the cooling-medium circulation system in conjunction with temperature controls 42 in such a way that the volume of circulating water is always maintained constant and only minimum temperature regulation will occur in order to maintain the desired and prescribed low mass temperature at the end of cooling phase 43. Temperature controls 42 activate magnetically controlled valve 30.

A safety pressure-control switch 61 can be provided in the vicinity of cooling phase 43. Line 13, which conveys the warm mass, can be equipped with a temperature sensor 62 and an indicator 63 to display the mass-intake temperature.

The second circulation system, which is the heating-medium circulation system, is basically similar to the first circulation system, except that the mass is heated within heating phase 44. A line 64 that branches off from line 23 is equipped with a flow-control valve 65, a magnetically controlled valve 66, and a manually controlled cock 67. Warm water can accordingly flow from the cooling-medium circulation system into a mixing tank 68 in the heating-medium circulation system. Thence a line 69 flows to a pump 70 and, by way of a check valve 71 and a manometer 72 in a line 73, to the uppermost heating chamber 47 in heating phase 44. At this point as well the warm water travels in the opposite direction through heating stages 45 and arrives back in mixing tank 68 by way of a line 74. In mixing tank 68 there is a heater 75 that can be operated in conjunction with a temperature sensor 76 and a contact thermometer 77 to keep the mass warm overnight. Branching off of line 73 is a line 78 that includes a manually operated cock 79. Line 78 leads to mass outlet 18, the conducting components of which are heated to or maintained at temperatures that ensure that the tempered mass will not drop below a practical outlet temperature as it travels to the further-processing station. A return line 80 contains a manually operated cock 81. A temperature sensor 82 and safety thermometer 83 monitor the temperature of the mass at the associated point in heating phase 44. There is also a temperature sensor 84 that measures the mass-outlet temperature and is connected to a display 85 that indicates the mass-outlet temperature. This heating-medium circulation system also contains a water-outlet valve 86. There is a temperature sensor 87 in line 73 that operates in conjunction with temperature controls 88 that activate magnetically controlled valve 66. Excess water is removed from both heating-medium circulation system and cooling-medium circulation system through a cooling-water return line 89.

FIG. 5 illustrates the sequence of temperatures in the apparatus illustrated in FIG. 4. Cooling phase 43 is of approximately the same size as heating phase 44, containing the same number of cooling stages 6 and heating stages 45. If the mass remains in cooling phase 43 2.5 minutes, it will remain in heating phase 44 the same amount of time. The mass to be processed can be supplied to the lowermost cooling stage 6 through line 13 at a temperature of approximately 43°–50° C. The temperature of the cooling water in the cooling-medium circulation system is approximately 16°–22° C. and is in this case indicated only schematically for the vicinity of cooling phase 43. Since the cooling water is traveling in the opposite direction, the line that is illustrated as horizontal would actually slope slightly up, with the heat absorbed by the mass possibly heating the cooling water to approximately 0.5° C. What is essential is that the volume of water in circulation be very large, in order to generate turbulence in cooling chambers 9. The temperature in the cooling-medium circulation system is measured in terms of the actual temperature of the mass at the end of cooing phase 43 by means of temperature sensor 41 and equilibrated by temperature controls 42 in conjunction with magnetically controlled valve 30. At the end of cooling phase 43 the mass will have a temperature of 28°–29° C., at which it will enter heating phase 44. At that point the warm water is introduced into circulation at a temperature of approximately 31.5°–33° C., and also traveling in the opposite direction. The requisite warm water is obtained from the cooling-medium circulation system and heated by heater 75. This warm water decreases its temperature as it travels through mass chambers 46 and must be reheated. The chocolate is heated in heating phase 44, specifically to a mass-outlet temperature of approximately 31.5°–32.5° C. This mass-outlet temperature is approximately 2° C. higher than that previously known, resulting in improved furtherprocessing properties.

I claim:

1. Tempering machine for substances containing cocoa butter and similar fats, particularly chocolate masses, comprising: at least one mass chamber with mixing and stirring elements and a cooling stage having heat-exchange surfaces; a cooling circuit with a cooling medium therethrough connected to said cooling stage, said masses being cooled through heat exchange at said heat-exchange surfaces; a heating stage with heat-exchange surfaces; a tempering circuit with a tempering medium connected to said heating stage, said masses being reheated after being cooled through heat exchange at said heat-exchange surfaces of said heating stage; said heat exchange surfaces of said heating stage being at least 40% of the sum of said heat-exchange surfaces of said cooling stage and said heating stage for maintaining a constantly regulated temperature of the heat-exchange surfaces of said heating stage.

2. A tempering machine as defined in claim 1, wherein said heat exchange surfaces of said heating stage comprise 50% of the sum of said heat-exchange surfaces of said cooling stage and said heating stage.

3. A tempering machine as defined in claim 1, including a temperature sensor on a side of said tempering medium of said heating stage for maintaining constant the temperature of said tempering medium and thereby the temperature of said heat-exchange surfaces of said heating stage.

4. A tempering machine as defined in claim 1, wherein said tempering circuit of said heating stage has turbulent flow conditions; said heating stage having a mass chamber with driven mixing and stirring elements for mixing said masses intensively and turbulently.

5. A tempering machine as defined in claim 4, wherein said cooling circuit of said cooling stage has also turbulent flow conditions.

6. A tempering machine as defined in claim 1, wherein said cooling stage has mass chambers and said heating stage has mass chambers, said mass chambers of said cooling stage and said heating stage having substantially similar mixing and stirring elements for mixing said masses intensively and turbulently.

7. A tempering machine as defined in claim 6, wherein said mass chambers of said cooling stage and said mass chambers of said heating stage have substantially similar flow-through surfaces and substantially similar geometrical arrangements for applying equal delay times for said masses.

8. Apparatus for continuousing processing substances containing cocoa butter or similar fats, particular chocolate masses, comprising: a tempering machine having a plurality of cooling stages with cooling surfaces followed by heating stages with heating surfaces; mass chambers for passing said masses therethrough; driven impellers in said mass chambers for stirring said masses; said masses being supplied through said mass chambers to said cooling stages and to said heating stages; cooling chambers adjacent to said cooling surfaces and conducting cooling medium through said cooling chambers; heating chambers adjacent to said heating surfaces and conducting heating medium through said heating chambers; sufficient cooling medium flowing through said cooling chambers to generate turbulence in said cooling chambers; stirring means in said mass chambers for stirring said masses sufficiently intensively to thoroughly blend said masses; said masses being removed from said cooling surfaces and said heating surfaces without contact with said impellers; said cooling surfaces and heating surfaces and said impellers having a gap therebetween, flow in said gap having a shearing gradient of from 500 to 400 sec$_{-1}$; a tempering column in the form of a cylinder consisting of a stack of several cooling chambers that communicate with a cooling-medium circulation system alternating with several heating chambers that communicate with a heating-medium circulation system, with mass chambers left between the cooling surfaces and the heating surfaces, accommodating impellers that rotate on a common vertical driveshaft, and communmcating with one another through access openings, with a pump that forces mass through the mass chambers, another pump that forces cooling medium through the cooling chambers, and a third pump that forces heating medium through the heating chambers, said access openings between each pair of adjacent mass chambers being positioned alternately radially outward and radially inward, in that the impellers are non-contacting scraping and blending components, in that the cooling-medium pump is, for the purposes of generating turbulence, designed for high output, and in that the cooling-medium circulation system has temperature controls.

9. Apparatus as in claim 8, characterized in that the impellers (11) are arms (34) that extend radially out of the driveshaft (1) and are equipped with a number of mixing blades (35).

10. Apparatus as in claim 8, characterized in that each mass chamber (8), which is essentially demarcated by two cooling surfaces (10), can accommodate only one impeller (11) with its arms (34) positioned more or less in the middle and in that the arms are equipped with blades (35) on each side in such a way as to force the mass in opposite directions.

11. Apparatus as in claim 8, characterized in that the blades (35) are in the shape of plates positioned aslant on the impeller arms (34).

12. Apparatus as in claim 11, charcaterized in that the blades are mounted at radially different slanting positions.

13. Apparatus as in claim 11, characterized in that the arms (34) are perforated.

14. Apparatus as in claim 8, characterized in that the arms (34) are mounted on bearing rings (32) that surround the driveshaft (1) and in that the bearing rings are perforated at one side to create the inner access openings.

15. Apparatus as in claim 8, characterized in that several cooling stages (6) and/or heating stages (45) are packaged together and in that each package of cooling stages is provided with its own cooling-medium circulation system or subsidiary cooling-medium circulation system and/or each package of heating stages is provided with its own heating-medium circulation system or subsidiary heating-medium circulation system.

* * * * *